United States Patent
Gurney et al.

(10) Patent No.: US 9,224,412 B2
(45) Date of Patent: Dec. 29, 2015

(54) PERPENDICULAR MAGNETIC RECORDING DISK WITH TEMPLATE LAYER FORMED OF A BLEND OF NANOPARTICLES

(71) Applicant: HGST Netherlands B.V., Amsterdam (NL)

(72) Inventors: Bruce Alvin Gurney, San Jose, CA (US); Ricardo Ruiz, Santa Clara, CA (US); Shi-Ling Chang Wang, San Ramon, CA (US); Qing Zhu, Austin, TX (US); Han Zou, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 54 days.

(21) Appl. No.: 14/169,255

(22) Filed: Jan. 31, 2014

(65) Prior Publication Data

US 2015/0221330 A1 Aug. 6, 2015

(51) Int. Cl.
*G11B 5/66* (2006.01)
*G11B 5/73* (2006.01)

(52) U.S. Cl.
CPC .................................. *G11B 5/7325* (2013.01)

(58) Field of Classification Search
None
See application file for complete search history.

(56) References Cited

U.S. PATENT DOCUMENTS

| | | | |
|---|---|---|---|
| 7,153,597 B2 | 12/2006 | Yang et al. | |
| 7,175,925 B2 | 2/2007 | Chen et al. | |
| 7,431,999 B2 | 10/2008 | Iwasaki et al. | |
| 7,776,388 B2 | 8/2010 | Dobisz et al. | |
| 7,799,446 B2 | 9/2010 | Mukai | |
| 7,824,466 B2 | 11/2010 | Vanheusden et al. | |
| 8,048,546 B2 | 11/2011 | Albrecht et al. | |
| 8,202,571 B2 * | 6/2012 | Kodama et al. | 427/129 |
| 8,889,776 B2 | 11/2014 | Curry et al. | |
| 2002/0142163 A1 * | 10/2002 | Mino et al. | 428/403 |
| 2003/0108664 A1 | 6/2003 | Kodas | |
| 2004/0071924 A1 * | 4/2004 | Yang et al. | 428/65.3 |
| 2005/0009079 A1 * | 1/2005 | Anders et al. | 435/6 |
| 2006/0083694 A1 | 4/2006 | Kodas | |
| 2006/0099430 A1 * | 5/2006 | Subramanya et al. | 428/447 |
| 2008/0085410 A1 | 4/2008 | Simone | |
| 2008/0305365 A1 | 12/2008 | Yamazaki et al. | |
| 2009/0226606 A1 | 9/2009 | Inamura | |

(Continued)

OTHER PUBLICATIONS

Jie et al., "Laterally patterned magnetic nanoparticles", J Matl Chem, vol. 22, Jan. 2012, pp. 1962-1968.*

(Continued)

*Primary Examiner* — Holly Rickman
(74) *Attorney, Agent, or Firm* — Thomas R. Berthold

(57) ABSTRACT

A continuous-media perpendicular magnetic recording disk has a granular recording layer (RL) with controlled grain pitch distribution and controlled long range ordering of the grains. The disk includes a substrate with a template layer for the RL that comprises a blend of at least two different sized nanoparticles. The nanoparticles have a nanoparticle core with attached polymer ligands. The nanoparticle cores protrude above the surface of the template layer to provide a nonplanar surface topology. The blend of two sizes of nanoparticles causes the RL to have low grain pitch distribution and a disruption of long range ordering so that there are no large magnetic rafts. One of the nanoparticles types has a diameter greater than 105% of the diameter of the other nanoparticle type and is present in the total blend of nanoparticles of between about 5% and 35% or between about 55% and 90%.

19 Claims, 7 Drawing Sheets

(56) References Cited

U.S. PATENT DOCUMENTS

2010/0135937 A1    6/2010    O'Brien et al.
2012/0082866 A1    4/2012    Xiao et al.

OTHER PUBLICATIONS

Wang et al, "Understanding Noise Mechanism in Small Grain Size Perpendicular Thin Film Media", IEEE Trans Mag 46, 2391 (2010).

D. V. Talapin, MRS Bulletin 37, 63-71 (2012).

Green, "Solution routes to III-V semiconductor quantum dots", Current Opinion in Solid State and Materials Science 6, pp. 355-363 (2002).

Fischer et al., "Completely Miscible Nanocomposites", Angew. Chem. Int. Ed. 2011, 50, 7811-7814.

M. J. Benitez, "Structural and magnetic characterization of self-assembled iron oxide nanoparticle arrays," Journal of Physics: Condensed Matter, vol. 23, No. 12, Mar. 30, 2011; available on-line at http://arxiv.org/ftp/arxiv/papers/1010/1010.0938.pdf.

Sun et al., "Controlled Synthesis and Assembly of FePt Nanoparticles", Journal of Physical Chemistry B (2003), 107 (23), 5419-5425.

Xia, et al., "Monodispersed Colloidal Spheres: Old Materials with New Applications," Advanced Materials, vol. 12, pp. 693-713, 2000.

EPO Search Report, Application GB1501416.0 (Jul. 8, 2015).

\* cited by examiner

PERPENDICULAR MAGNETIC RECORDING DISK WITH TEMPLATE LAYER FORMED OF A BLEND OF NANOPARTICLES

BACKGROUND OF THE INVENTION

1. Field of the Invention

This invention relates generally to perpendicular magnetic recording media, such as perpendicular magnetic recording disks for use in magnetic recording hard disk drives, and more particularly to a continuous-media type of perpendicular magnetic recording disk with a granular recording layer having controlled grain size.

2. Description of the Related Art

In a "continuous-media" perpendicular magnetic recording disk, the recording layer is a continuous layer of granular cobalt-alloy magnetic material that becomes formed into concentric data tracks containing the magnetically recorded data bits when the write head writes on the magnetic material. Continuous-media disks, to which the present invention is directed, are to be distinguished from "bit-patterned-media" (BPM) disks, which have been proposed to increase data density. In BPM disks, the magnetizable material on the disk is patterned into small isolated data islands such that there is a single magnetic domain in each island or "bit". The single magnetic domains can be a single grain or consist of a few strongly coupled grains that switch magnetic states in concert as a single magnetic volume. This is in contrast to continuous-media disks wherein a single "bit" may have multiple magnetic grains.

FIG. 1 is a schematic of a cross-section of a prior art perpendicular magnetic recording continuous-media disk. The disk includes a disk substrate and an optional "soft" or relatively low-coercivity magnetically permeable underlayer (SUL). The SUL serves as a flux return path for the field from the write pole to the return pole of the recording head. In the example of FIG. 1, the material for the recording layer (RL) is a granular ferromagnetic cobalt (Co) alloy, such as a CoPtCr alloy, with a hexagonal-close-packed (hcp) crystalline structure having the c-axis oriented substantially out-of-plane or perpendicular to the RL. The granular cobalt alloy RL should also have a well-isolated fine-grain structure to produce a high-coercivity ($H_c$) media and to reduce intergranular exchange coupling, which is responsible for high intrinsic media noise. Enhancement of grain segregation in the cobalt alloy RL is achieved by the addition of a nonmagnetic segregant, which is depicted in FIG. 1 as an oxide, including oxides of Si, Ta, Ti, Nb, B, C, and W. These oxides (Ox) tend to form at the grain boundaries as shown in FIG. 1, and together with the elements of the cobalt alloy form nonmagnetic intergranular material. An optional capping layer (CP), such as a granular Co alloy without added oxides or with smaller amounts of oxides than the RL, is typically deposited on the RL to mediate the intergranular coupling of the grains of the RL, and a protective overcoat (OC) such as a layer of amorphous diamond-like carbon is deposited on the CP.

The Co alloy RL has substantially out-of-plane or perpendicular magnetic anisotropy as a result of the c-axis of its hexagonal-close-pack (hcp) crystalline structure being induced to grow substantially perpendicular to the plane of the layer during deposition. To induce this growth of the hcp RL, intermediate layers of ruthenium (Ru1 and Ru2) are located below the RL. Ruthenium (Ru) and certain Ru alloys, such as RuCr, are nonmagnetic hcp materials that induce the proper growth of the RL. An optional seed layer (SL) may be formed on the SUL prior to deposition of Ru1.

The enhancement of segregation of the magnetic grains in the RL by the additive oxides as segregants is important for achieving high areal density and recording performance. The intergranular Ox segregant material not only decouples intergranular exchange but also exerts control on the size and distribution of the magnetic grains in the RL. Current disk fabrication methods achieve this segregated RL by growing the RL on the Ru2 layer that exhibits columnar growth of the Ru or Ru-alloy grains. The amount of Ox segregants inside the RL needs to be sufficient to provide adequate grain-to-grain separation, but not too high to destroy the thermal stability of the RL. The typical content of the Ox segregants is about 20% in volume, and the mean grain boundary thickness is typically between about 1.0 and 1.5 nm.

FIG. 2 is a transmission electron microscopy (TEM) image of a portion of the surface of a prior art CoPtCr—$SiO_2$ RL from a disk similar to that shown in FIG. 1. FIG. 2 shows well-segregated CoPtCr magnetic grains separated by intergranular $SiO_2$ (white areas). However, as is apparent from FIG. 2, there is a relatively wide variation in the size of the magnetic grains. FIG. 2 also illustrates the randomness of grain locations, which results in a wide variation in the grain-to-grain distance or grain "pitch". Because the nucleation sites during the sputtering deposition are randomly distributed by nature, there is no control of the grain locations. A wide grain size distribution and wide grain pitch distribution are undesirable because they can cause wide distributions in magnetic anisotropy strength and intergranular exchange, which contribute to noise in the readback signal.

To achieve high areal density of 1 to 5 Terabits/$in^2$ and beyond, it is desirable to have high uniformity (or tighter distribution) of the grains within the RL, mainly for the structural parameters of grain diameter (i.e., the diameter of a circle that would have the same area as the grain), and grain-to-grain distance or grain pitch (i.e., the distance between the centers of adjacent grains). Narrower distribution of grain diameter and grain pitch will lead to narrower distributions of magnetic exchange interaction and magnetic anisotropy strength, both of which are desirable.

Thus the prior art RL shown in FIG. 2 is far from ideal. First, the grains have an irregular polygonal shape with a large size distribution. The average grain diameter is about 8-11 nm with a relatively wide distribution of over 20%. Second, the location of the grain centers is highly random, with a wide distribution of 20-23% of the mean. The distribution information is obtained by measuring neighboring grain-to-grain distances in high resolution scanning electron microscopy (SEM) or TEM images and then fitting with a log normal function. Distribution value as referred to in this application shall mean the width of the lognormal function.

A magnetic recording disk with a Co alloy and oxide-segregant RL and a nanoparticle template layer below the Ru underlayer is described in application Ser. No. 13/772,110 filed Feb. 20, 2013 and assigned to the same assignee as this application. The nanoparticles are nanoparticle cores with polymer ligands that self-assemble in a regular pattern across the disk substrate. The Ru underlayer generally replicates the surface topology of the nanoparticle template and the Ru "bumps" above the nanoparticles serve as nucleation sites for the growth of the Co alloy grains of the RL. The result is a disk with a Co alloy RL having reduced grain diameter distribution and reduced grain pitch distribution.

While narrower grain pitch distribution has been achieved due to the mechanism of self-assembly and uniformity in size of the nanoparticles, "rafts" of nanoparticles with long range ordering are also formed. Post-deposition annealing of the nanoparticles is commonly used to lower the grain pitch distribution, but this tends to increase raft size dramatically. Raft boundaries are the regions between rafts where the nanoparticles are not arranged in a regular pattern. Since the sizes and locations of the Co alloy magnetic grains are defined by the initial nanoparticle locations on a one-to-one basis, large rafts and long raft boundaries in the nanoparticle template will lead to formation of large magnetic rafts and raft boundaries, which will degrade media performance.

Therefore, for a granular cobalt alloy RL with additive oxides formed on a nanoparticle template, it is desirable not only to reduce the grain pitch distribution but to control the long range ordering of the grains without enlarging rafts and raft boundaries. This will enable a continuous-media perpendicular magnetic recording disk with a narrow distribution of grain pitch but with controlled long range ordering of the grains.

SUMMARY OF THE INVENTION

Embodiments of the invention relate to a layered nanoparticle structure comprising a blend of at least two different sized nanoparticles formed as a layer on a substrate. In one embodiment the nanoparticles form a template layer for a continuous-media perpendicular magnetic recording layer (RL) having controlled grain pitch distribution and controlled long range ordering of the grains. The disk includes a substrate with a template layer formed on the substrate. The template layer comprises a blend of at least two different sized nanoparticles. The term "nanoparticle" as used herein means a nanoparticle core with attached polymer ligands having functional end groups for attachment to the core. The nanoparticle cores protrude above the surface of the template layer to provide a nonplanar surface topology. A seed layer covers the template layer and an underlayer, for example Ru or a Ru alloy if the RL is a Co alloy, covers the seed layer. A perpendicular magnetic RL comprising a layer of granular ferromagnetic material, like a Co alloy, and one or more oxides of one or more of Si, Ta, Ti Nb, B, C, and W is formed on the underlayer.

The seed layer generally replicates the surface topology of the underlying template layer. In the case of a Co alloy RL, the Ru or Ru alloy underlayer replicates the surface topology of the underlying seed layer and defines the texture for the growth of the Co alloy RL. As a result of the blend of two sizes of nanoparticles in the template layer, the resulting RL will have low grain pitch distribution and also a disruption of long range ordering so that there are no large magnetic rafts.

One of the nanoparticles types has a diameter greater than 105% of the diameter of the other nanoparticle type and is present in the total blend of nanoparticles of between about 5% and 35% or between about 55% and 90%. Both the nanoparticle core and the core with polymer ligand for each nanoparticle type has a size or diameter with low poly-dispersity, meaning that there is small diameter distribution. For example, the cores should have a diameter distribution of less than 10%. Low poly-dispersity of each of the at least two different-sized types of nanoparticle cores and nanoparticles enables the extent of disorder, and thus the raft size, as well as the width of the grain pitch distribution, to be more accurately controlled by the blend ratio.

For a fuller understanding of the nature and advantages of the present invention, reference should be made to the following detailed description taken together with the accompanying figures.

DETAILED DESCRIPTION OF THE INVENTION

Figure 3:
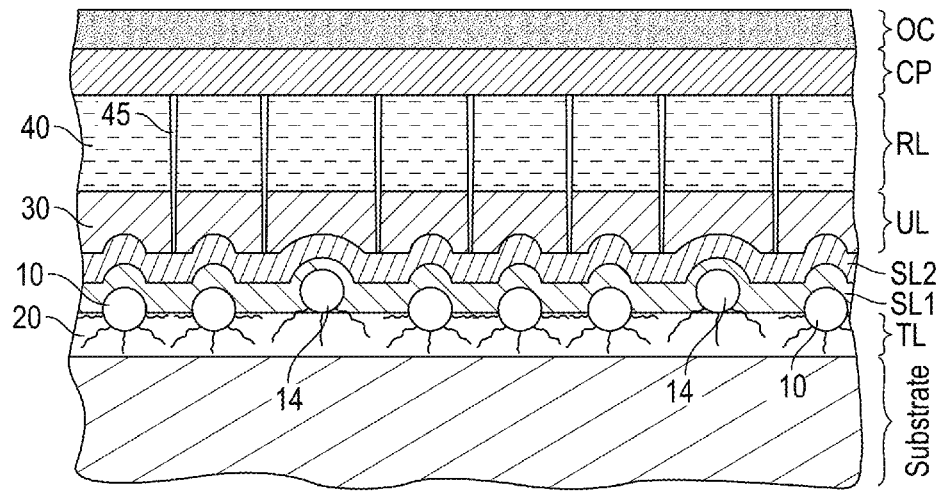
FIG. 3 is a side sectional view of the continuous-media perpendicular magnetic recording disk according to an embodiment of this invention illustrating a template layer (TL) and at least one seed layer (SL1) located between the substrate and the Ru or Ru alloy underlayer (UL).

FIG. 3 is a side sectional view of the continuous-media perpendicular magnetic recording disk according to an embodiment of the invention. In the disk according to this invention a nanoparticle template layer (TL) and at least one seed layer (SL1), both of which will be described in detail below, are located between the substrate and the Ru or Ru alloy underlayer (UL).

Figure 1:
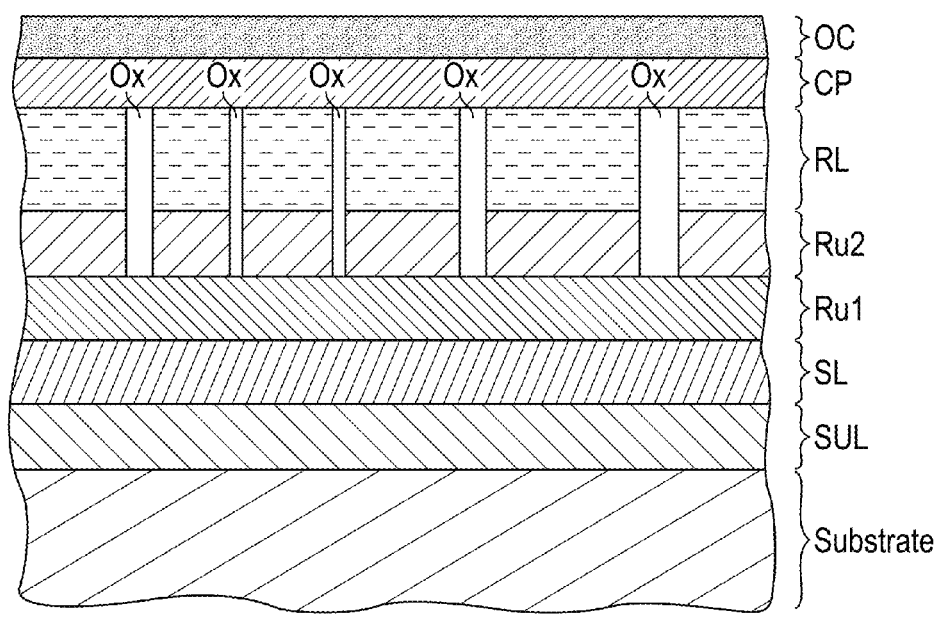
FIG. 1 is a schematic of a cross-section of a perpendicular magnetic recording disk according to the prior art.
Figure 2:
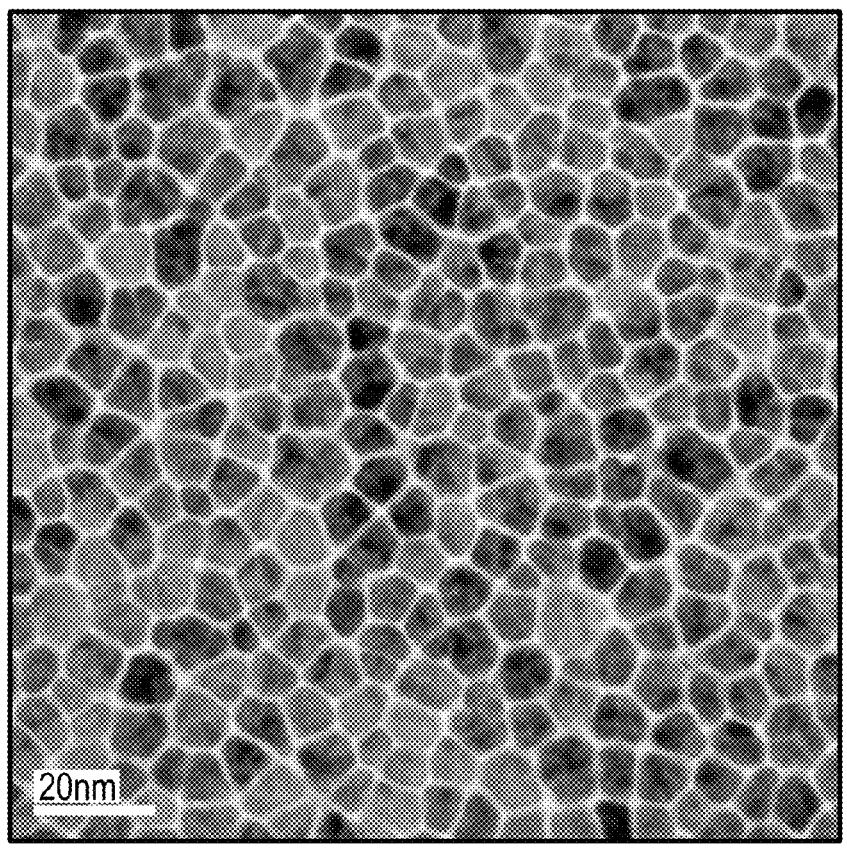
FIG. 2 is a transmission electron microscopy (TEM) image of a portion of a surface of a CoPtCr—$SiO_2$ recording layer of a prior art perpendicular magnetic recording disk similar to the disk depicted in FIG. 1.

The disk substrate may be any commercially available glass substrate or a wafer or disk of a material such as, but not limited to, silicon (Si), fused quartz, carbon, or a silicon nitride ($SiN_x$). An optional conventional SUL (not shown in FIG. 3) may be located between the substrate and the TL. The SUL may be a single soft magnetic layer (as shown in FIG. 1) or a multilayer of soft magnetic layers separated by nonmagnetic layers. The SUL layer or layers are formed of amorphous magnetically permeable materials such as alloys of CoNiFe, FeCoB, CoCuFe, NiFe, FeAlSi, FeTaN, FeN, FeTaC, CoTaZr, CoFeB, and CoZrNb. The thickness of the SUL is typically in the range of approximately 20-400 nm.

An optional second seed layer (SL2) may be formed on SL1 and an underlayer (UL) of ruthenium (Ru) or a Ru alloy is formed on SL2, or SL1 if there is no SL2. The Ru or Ru alloy UL is formed as fully or partially disconnected islands 30 over the SL2, or the SL1 if there is no SL2. The recording layer (RL) is a granular ferromagnetic cobalt (Co) alloy, such as a CoPtCr alloy or a CoPtCrB alloy, with intergranular oxides, including oxides of one or more of Si, Ta, Ti, Nb, B, C, and W. The Co alloy has a hexagonal-close-packed (hcp) crystalline structure having the c-axis oriented substantially out-of-plane or perpendicular to the RL. The Ru islands 30 of the UL promote the growth of the Co alloy grains 40 of the RL so that the c-axis of the hcp Co alloy material is oriented substantially perpendicular, thereby resulting in perpendicular magnetic anisotropy. The oxide segregants generally form as intergranular material 45 between the Co alloy grains 40.

An optional conventional capping layer (CP), such as a granular Co alloy without added oxides or with smaller amounts of oxides than the RL, is typically deposited on the RL to mediate the intergranular coupling of the grains of the RL. A conventional protective overcoat (OC) such as a layer of amorphous diamond-like carbon is typically deposited on the CP, or on the RL if there is no CP.

The TL comprises at least two types of nanoparticles of different sizes that form a monolayer of a polymer base 20 with embedded nanoparticle cores 10, 14. As shown in the embodiment of FIG. 3, the nanoparticle cores 10, 14 have upper surfaces not covered by the polymer material are thus exposed prior to deposition of SL1. Also, while the TL will be described for an embodiment wherein the RL is a Co alloy with oxide segregants formed above a Ru underlayer, the TL is fully applicable to other magnetic media as a RL, such as FePt with other nonmagnetic segregants, such as C, B or BC. In such an embodiment different materials may be chosen for the UL, SL1 and optional SL2, with the nanoparticle cores of the TL serving as nucleation sites for the magnetic grains.

The term "nanoparticle" as used herein means a nanoparticle core with attached polymer ligands having functional end groups for attachment to the core. Nanoparticle cores (also called nanocrystals) include small sub-100 nm sized crystalline particles composed of materials such as CdSe, CdTe, PbSe, FePt, iron oxide (FeOx), Si, ZnO, Au, Ru, Cu, Ag, Pt and vanadium oxide ($VO_x$). Nanoparticle cores can be synthesized in a variety of sizes and with narrow size distributions. For example, CdSe cores are commercially available with diameters ranging from 2-7 nm. Other semiconductor cores are also available. This includes III-V semiconductors as described in D. V. Talapin, *MRS Bulletin* 37, 63-71 (2012) and in Green, "Solution routes to III-V semiconductor quantum dots", *Current Opinion in Solid State and Materials Science* 6, pp. 355-363 (2002).

An embodiment of the invention will be described for an example where both types of nanoparticles are iron-oxide ($Fe_3O_4$) cores with polystyrene ligands with an end group of COOH, but wherein the polystyrene ligands in one nanoparticle type has a greater molecular weight (and thus longer polymer chain length) than the polystyrene ligands in the other nanoparticle type. This results in the TL having nanoparticles of two substantially different sizes.

Figure 4A:
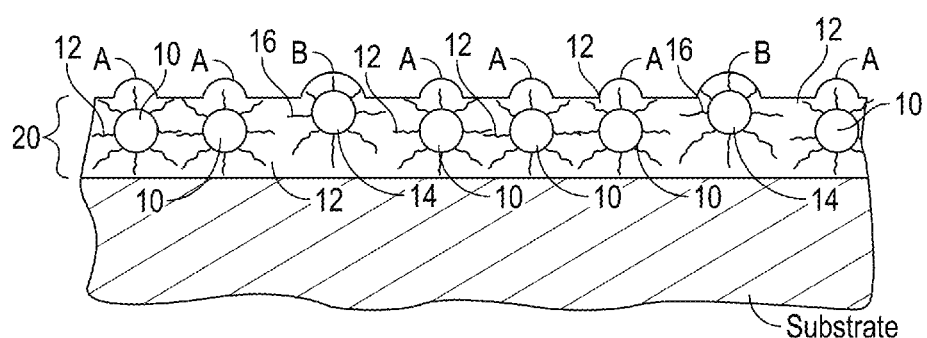
FIG. 4A is a side sectional schematic showing a first step in the method of forming the template layer (TL) with a blend of two different sized nanoparticles in the disk according to an embodiment of the invention.
Figure 4B:
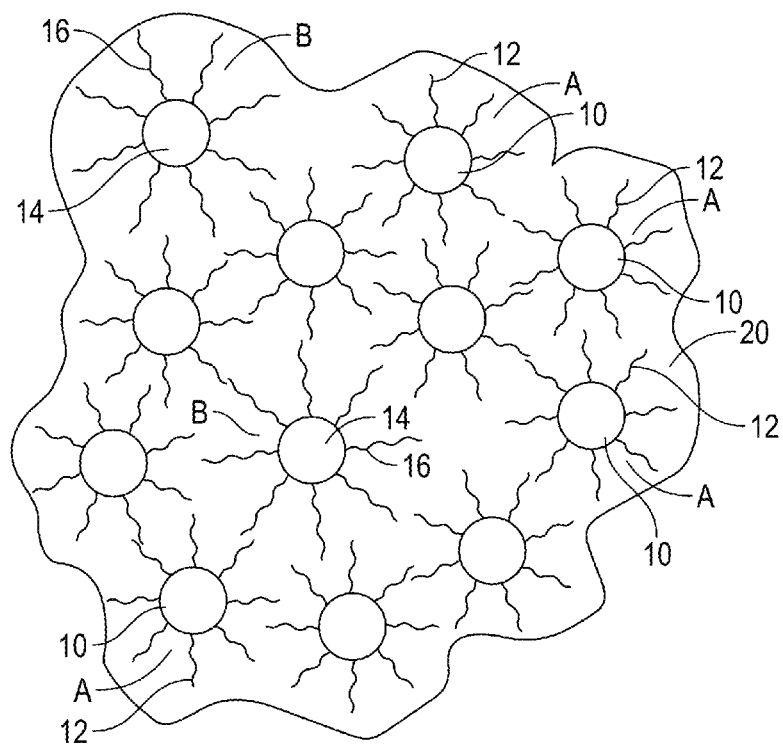
FIG. 4B is a top schematic showing the two different sized nanoparticles and the disruption of ordering in the TL depicted in FIG. 4A.

FIG. 4A is a side sectional schematic showing a first step in the method of forming the TL. A film 20 comprising smaller nanoparticles A (with cores 10 and shorter ligands 12) and larger nanoparticles B (with cores 14 and longer ligands 16) is formed on the substrate surface. The nanoparticles are preferably formed on the substrate substantially as a monolayer, meaning that the vast majority, e.g., at least 90%, of the nanoparticles form a single layer of nanoparticles. As used herein the nanoparticle cores 10, 14 are separated by the attached polystyrene chains 12, 16. As depicted in the top schematic view of FIG. 4B, the A nanoparticles have short range ordering within approximately 3-5 grain distances, which means that within this short range they are arranged in a generally uniform pattern on the substrate surface. However, the B nanoparticles, because of their larger size, disrupt the long range ordering of the A nanoparticles. As used herein, "long range ordering" shall mean that the nanoparticles form a uniform pattern over at least 5 grain distances.

The film 20 is formed by spin coating a solution of the A and B nanoparticles on the substrate surface and allowing the solution to dry, although other methods of dispersal are possible. Nanoparticles A are $Fe_3O_4$ nanocrystals with a diameter of about 4 nm with polystyrene ligands with molecular weight of about 1 kg/mol. Nanoparticles B are $Fe_3O_4$ nanocrystals with a diameter also of about 4 nm but with polystyrene ligands with molecular weight of about 4 kg/mol. Each type of nanoparticles A and B has low poly-dispersity, meaning that that all the nanoparticles of the same type are substantially the same size or diameter. For example, A nanoparticles have a diameter of about 12 nm and B nanoparticles have a diameter of about 14 nm. The A and B nanoparticles, with the desired blend ratio, are then dissolved in toluene (or other solvent) at a concentration of about 1-25 mg/ml. The blend ratio can be between about 5% to about 95% of nanoparticle B in the total of A and B nanoparticles, with the blend ratio selected to achieve the desired amount of disorder in the long range ordering. A single layer of A and B nanoparticles can be formed by proper selection of the spinning speed. During this process, the polystyrene ligand molecules from both the A and B nanoparticles coil together to construct a continuous film of polystyrene, within which the $Fe_3O_4$ nanoparticle cores are embedded. The process for forming the film of $Fe_3O_4$ nanoparticle cores embedded in the matrix of polymer material to form a single layer of generally uniformly distributed nanoparticle cores is described by Fischer et al., "Completely Miscible Nanocomposites", *Angew. Chem. Int. Ed.* 2011, 50, 7811-7814.

Figure 4C:
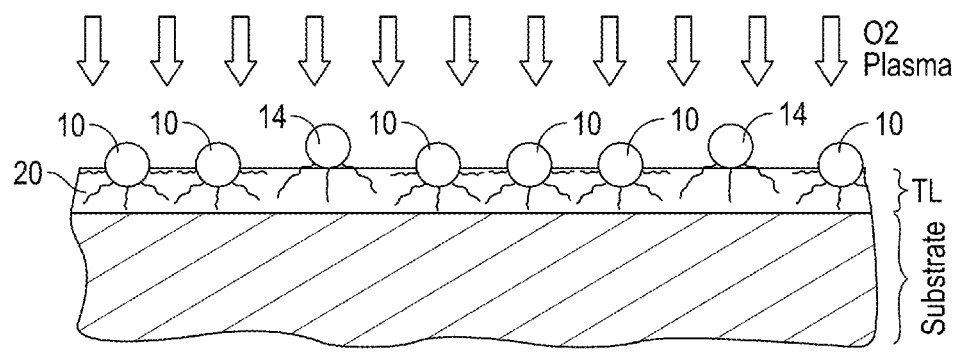
FIG. 4C illustrates the step of etching away a portion of the polymer material of the film shown in FIG. 4A to expose the surfaces of the nanoparticle cores of the TL.

FIG. 4C illustrates the step of etching away a portion of the polymer material 20 of the film shown in FIG. 4A to expose the surfaces of the $Fe_3O_4$ nanoparticle cores 10 14. This results in the $Fe_3O_4$ nanoparticle cores 10, 14 being only partially embedded in the matrix of polymer material 20. An oxygen ($O_2$) plasma reacts with the polystyrene chains and turns them into gas and water vapor, which are pumped away. Because the nanoparticle cores are an oxide they are not significantly affected by the $O_2$ plasma. By controlling the plasma treating time and the plasma intensity, the amount of polystyrene stripped away can be controlled, and thus the amount of protrusion of the $Fe_3O_4$ nanoparticle cores can be controlled. The preferred amount of protrusion of the $Fe_3O_4$ nanoparticle cores is between about 35 to 75 percent of the diameter of the cores. This is accomplished with a $O_2$ plasma treatment for about 30-50 seconds. After the partial removal of the polystyrene, the surface has topographic protrusions of $Fe_3O_4$ nanoparticle cores 10, 14, as well as a chemical contrast between the $Fe_3O_4$ nanoparticle core surfaces and the surrounding remaining polystyrene material 20. While etching of sufficient polymer material to expose the surfaces of the nanoparticles is preferred because it results in both a topographic surface and a chemical contrast, the polymer material may be etched to a lesser extent so that the nanoparticles may still retain a thin film of polymer material but still produce a topographic surface.

Figure 4D:
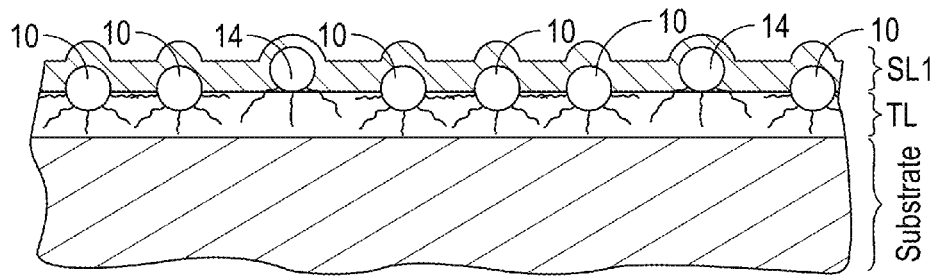
FIG. 4D illustrates the step of homogenizing the surface of the TL depicted in FIG. 4C.

FIG. 4D illustrates the step of homogenizing the surface of FIG. 4C. A thin amorphous metallic layer serves as a first seed layer (SL1). SL1 is preferably a NiTa alloy or other amorphous material; sputter deposited onto the exposed surfaces of the $Fe_3O_4$ nanoparticle cores 10, 14 and the surface of the remaining polystyrene material 20 to a thickness between about 1 to 10 nm. The SL1 thus conforms to and generally replicates the topographic surface of the exposed nanoparticle cores 10, 14 and surrounding polymer material 20. At this thickness, SL1 is adequate to cover the entire surface, but not too thick to wash out the protrusion features of the nanoparticle cores 10, 14. After this step, the TL with SL1 is complete and ready for templated growth of the RL.

Figure 4E:
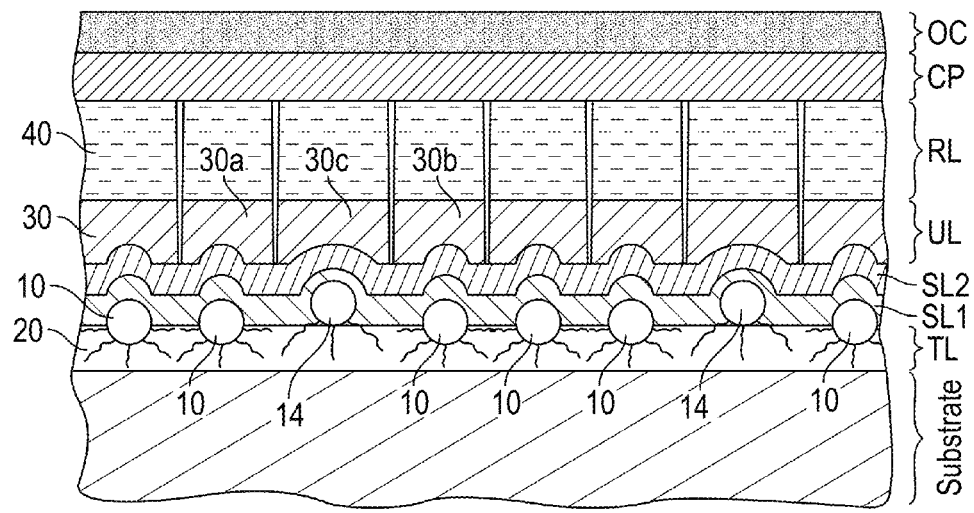
FIG. 4E illustrates the step of depositing the remaining layers of the disk according to an embodiment of the invention.

FIG. 4E illustrates the steps of depositing the remaining layers of the disk according to the invention. An optional second seed layer (SL2) is sputter deposited onto SL1. SL2 is a seed layer for the growth of the Ru or Ru alloy UL. SL2 is preferably a highly crystalline material, like a NiW alloy, with a thickness between about 3 to 10 nm, but SL2 may also be formed of NiV or NiFeW alloys. The SL2 improves the crystallinity of the hcp Ru or Ru alloy UL. Next a Ru layer is sputter deposited as the UL to a thickness between about 5 to 15 nm. The Ru UL defines the (0001) texture for the growth of the Co alloy RL. Due to the surface topography of the underlying SL1 and optional SL2, the Ru atoms preferentially nucleate on top of the small "bumps" created by the underlying $Fe_3O_4$ nanoparticle cores 10, 14. The resulting Ru grains can thus be disconnected. This results in a monolayer of Ru islands 30 with an arrangement that replicates the arrangement of the underlying $Fe_3O_4$ nanoparticle cores 10, 14. As a result of the cores 14 of the larger B nanoparticles, the regular spacing of the cores 10 of the A nanoparticles, and thus the Ru islands, is disrupted, as shown by Ru island 30c above core 14 between Ru islands 30a, 30b above cores 10. The pressure of Ar gas is an important factor during the sputtering of Ru because it determines the roughness of the Ru surface. Low Ar pressure (1-10 mTorr) leads to a rather smooth Ru surface and high Ar pressure (10-50 mTorr) leads to higher roughness. The fine control of Ru roughness by Ar pressure can be used to tune the extent of segregation among the RL grains which are grown on top of the Ru surface. Higher roughness in Ru causes stronger separation among the magnetic grains and less magnetic exchange coupling. In this invention, the Ar pressure is preferably between about 10 to 50 mTorr. While Ru is a commonly used material for the UL, the UL may also be formed of Ru-based alloys such as a RuCr or RuCo alloy.

Next the RL of a conventional Co alloy and one or more oxides is sputter deposited onto the Ru or Ru alloy UL. The RL is a granular ferromagnetic cobalt (Co) alloy, such as a CoPtCr alloy or a CoPtCrB alloy, with intergranular oxides, including oxides of one or more of Si, Ta, Ti, and Nb. The Co alloy has a hexagonal-close-packed (hcp) crystalline structure having the c-axis oriented substantially out-of-plane or perpendicular to the RL. The Ru islands 30 promote the growth of the Co alloy grains 40 of the RL so that the c-axis of the hcp Co alloy material is oriented substantially perpendicular, thereby resulting in perpendicular magnetic anisotropy. The oxide segregants generally form as intergranular material 45 between the Co alloy grains 40.

To complete the disk shown in FIG. 4E, an optional capping layer (CP) may be deposited on the RL, followed by the disk protective overcoat (OC). The CP typically consists of a ferromagnetic granular Co alloy, like a CoPtCr or CoPtCrB alloy, for mediating or controlling the intergranular exchange coupling in the RL. Thus the CP may have a greater amount of Cr and/or B than the RL, or a lesser amount of oxides than the RL. For example, the CP may have substantially the same Co alloy composition as the RL but have no oxides. As a result, the individual Co alloy grains of the CP are larger than the Co alloy grains of the RL and generally overlap multiple grains of the RL. The OC formed on the CP, or on the RL if there is no CP, may be an amorphous diamond-like carbon film or other known protective overcoat, such as silicon nitride (SiN).

Figure 5:
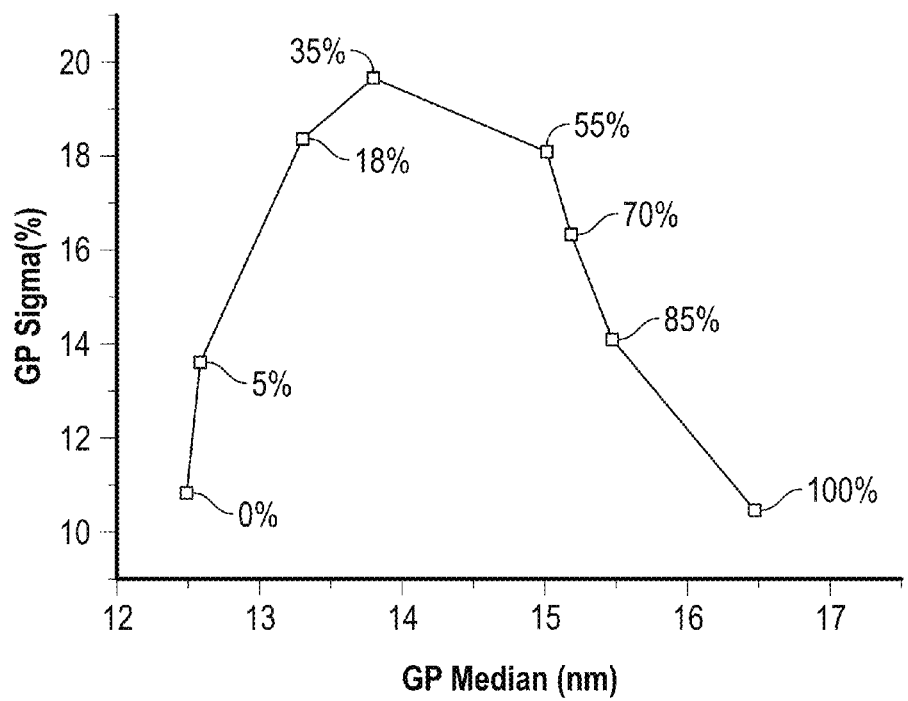
FIG. 5 is a graph of grain pitch sigma (width of the grain pitch distribution) as a function of median grain pitch for various blend ratios of B nanoparticles to total A and B nanoparticles.

As a result of the blend of two sizes of nanoparticles in the TL, the resulting RL will have low Co alloy grain pitch distribution and also a disruption of long range ordering so that there are no large magnetic rafts. FIG. 5 is a graph of grain pitch (GP) sigma (width of the grain pitch distribution) as a function of median grain pitch for various blend ratios of B nanoparticles to total A and B nanoparticles that were deposited by spin coating at a speed of 4000 RPM. FIG. 5 shows, for example, that as the B nanoparticles are increased from 0% to 5% the grain pitch sigma increases from about 10% to about 14%, with a peak grain pitch sigma of about 20% when the B nanoparticles are at 35%. As the amount of larger B nanoparticles increases toward 100% the median grain pitch of the blend of nanoparticles also increases.

Figure 6A:
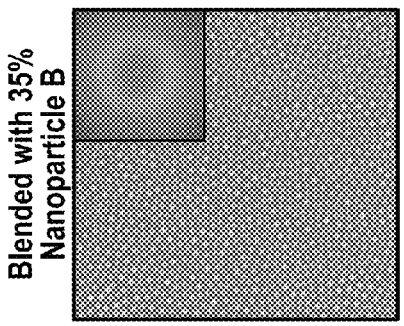
FIGS. 6A-6C are scanning electron microscopy (SEM) images of portions of template layers with various blend ratios of A and B nanoparticles.
Figure 6B:
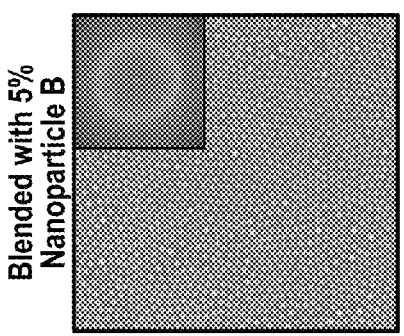
Figure 6C:
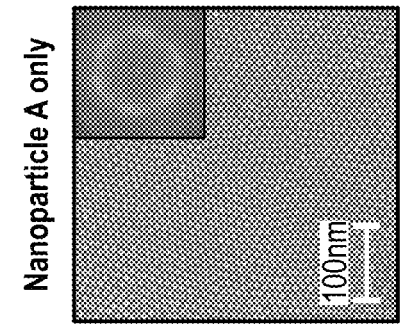

FIGS. 6A-6C are scanning electron microscopy (SEM) images of portions of template layers with various blend ratios of A and B nanoparticles. The image on the upper right portion of each figure is the Fast Fourier Transform (FFT) pattern of the corresponding SEM image. As the blend increases from no B nanoparticles (FIG. 6A) to 5% B nanoparticles (FIG. 6B) to 35% B nanoparticles (FIG. 6C) the FFT patterns change form a discrete ring to a sharp blur, indicating a disturbance in the ordering.

Figure 7A:
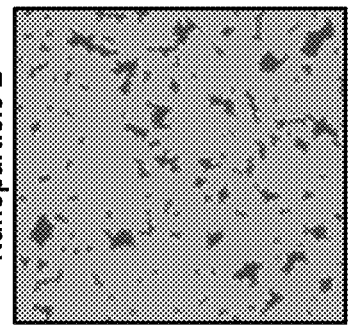
FIGS. 7A-7C are black/white maps computer-generated from the corresponding images of FIGS. 6A-6C using standard image processing software and represent regions of higher order (typically called "crystalline") and lower order (typically called amorphous") based on the orientational order parameter.
Figure 7B:
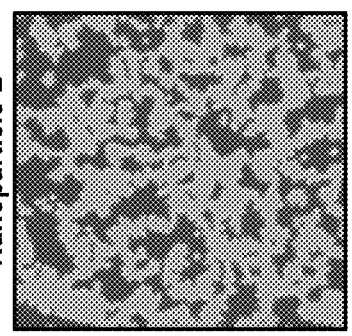
Figure 7C:
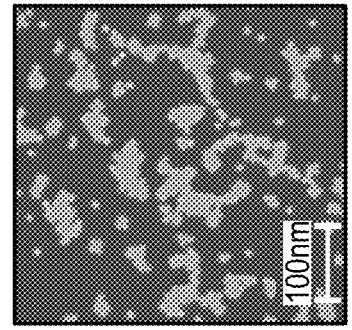

FIGS. 7A-7C are black/white maps computer-generated from the corresponding images of FIGS. 6A-6C using standard image processing software. The software locates the center of each nanoparticle, draws line segments joining them, calculates measures of order, including the orientational order parameter and ultimately generates the black/white binary maps that represent regions of high order (called rafts) and of low order in between the rafts (called raft boundaries). FIG. 7A shows large white areas, which indicate large rafts of similarly ordered nanoparticles. The size of the white areas decreases as the amount of B nanoparticles increases from 5% (FIG. 7B) to 35% (FIG. 7C). In FIG. 7C the white areas are much smaller than in FIG. 7A and far apart, indicating that the blend has created disorder and reduced the sizes of the rafts.

The larger sized nanoparticles should have a diameter that is at least 105% percent of the smaller sized nanoparticles. Two ranges of blend ratios are available to achieve the desired amount of disorder. This occurs because with increasing concentration the disorder increases from the case of pure nanoparticle A, reaches a maximum, and then decreases for the case of pure nanoparticle B. In the above example, wherein the A and B nanoparticles have relative diameters of 12 nm and 14 nm, respectively, the preferred blend ratio is with B nanoparticles between about 5% and 35% (in which case the B nanoparticles are the minority) and 55 and 90% (in which case the B nanoparticles are the majority). With these blend ratios the nanoparticle TL will create a RL with adequate grain pitch distribution width but without the formation of large magnetic rafts and raft boundaries.

The template layer (TL) for the disk of this invention has been described for $Fe_3O_4$ nanoparticle cores with polystyrene ligands with a functional group of COOH. However, examples of other nanoparticle cores include, but are not limited to, CdSe, CdTe, PbSe, FePt, iron oxide (FeOx), Si, ZnO, Au, Ru, Cu, Ag, Co, Pt and vanadium oxide ($VO_x$, e.g., $VO_2$, $V_2O_3$, $V_2O_5$). Examples of other polymer ligands include, but are not limited to, polydimethylsiloxane, polysiloxane, polyisoprene, polybutadiene, polyisobutylene polypropylene glycol, and polyethylene glycol. Examples of other functional groups for the polymers include, but are not limited to, carbocyl group (COOH), hydroxyl group (OH), amino group ($NH(CH_2)_2NH_2$) and thiol group (CSH).

The different-sized nanoparticles can be achieved by also selecting cores of different sizes, which are then attached to polymer ligands with the same or different molecular weights. By appropriate selection of the relative sizes of the two types of nanoparticles, and the blend ratio, the extent of disorder in the long range ordering, and thus the sizes of the rafts can be controlled. It is important that both the core and the core with polymer ligand for each nanoparticle type have a size or diameter with low poly-dispersity. For example, the cores should have a diameter distribution of less than 10%. Low poly-dispersity of each of the at least two different-sized types of nanoparticle cores and nanoparticles enables the extent of disorder, and thus the raft size, as well as the width of the grain pitch distribution, to be more accurately controlled by the blend ratio.

It is also within the scope of the invention to provide a TL with three or more types of different-sized nanoparticles. The use of three or more types of nanoparticles may enable better control of mean grain pitch and grain pitch distribution.

The layered nanoparticle structure, i.e., the blend of at least two different sized nanoparticles on a substrate, has been described above for application as a template layer for a continuous-media perpendicular magnetic recording layer with controlled grain pitch distribution and controlled long range ordering of the grains. However, the blend of two different sized nanoparticles with controlled nanoparticle size and blend ratio has other applications. For example, a generally ordered array of magnetic nanoparticles, like FePt based nanoparticles, dispersed on a substrate has been proposed as a magnetic recording layer. (Sun et al, "Controlled Synthesis and Assembly of FePt Nanoparticles", *Journal of Physical Chemistry B* (2003), 107 (23), 5419-5425). Another application is for photonic crystals which use ordered nanoparticles to produce Bragg diffraction of light. With controlled order, the band gap of the photonic crystal can be controlled. (Xia, et al., "Monodispersed Colloidal Spheres: Old Materials with New Applications," *Advanced Materials*, vol. 12, pp. 693-713, 2000).

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A layered nanoparticle structure comprising:
 a disk substrate;
 a nanoparticle template layer on the substrate, the nanoparticle template layer comprising a plurality of first nanoparticles and a plurality of second nanoparticles, each nanoparticle comprising a core with attached polymer ligands, wherein the first nanoparticles have substantially the same size and the second nanoparticles have substantially the same size different from the size of the first nanoparticles;
 an underlayer on the template layer; and
 a perpendicular magnetic recording layer on the underlayer, the magnetic n layer comprising a layer of granular ferromagnetic material and one or more nonmagnetic segregants.

2. The structure of claim 1 wherein the first nanoparticle cores have a size different from the size of the second nanoparticle cores.

3. The structure of claim 1 wherein the cores of the first and second nanoparticles are the same and the molecular weight of the polymer ligand attached to the first nanoparticles is different from the molecular weight of the polymer ligand attached to the second nanoparticles.

4. The structure of claim 1 wherein the second nanoparticles comprise greater than or equal to 5% and less than or equal to 35% of the total of first and second nanoparticles.

5. The structure of claim 1 wherein the second nanoparticles comprise greater than or equal to 55% and less than or equal to 90% of the total of first and second nanoparticles.

6. The structure of claim 1 wherein the second nanoparticles have a diameter that is greater than or equal to 105 percent of the diameter of the first nanoparticles.

7. The structure of claim 1 wherein the nanoparticle template layer is substantially a monolayer.

8. The structure of claim 1 wherein the first and second nanoparticle cores are selected from iron-oxide ($Fe_3O_4$), CdSe, CdTe, PbSe, FePt, Si, ZnO, Au, Ru, Cu, Ag, Co, Pt and vanadium oxide ($VO_x$); and wherein the first and second nanoparticle polymer ligands are selected from polystyrene, polydimethylsiloxane, polysiloxane, polyisoprene, polybutadiene, polyisobutylene polypropylene glycol, and polyethylene glycol.

9. The structure of claim 1 wherein each of the first and second nanoparticle cores has a nanoparticle core diameter distribution less than 10%.

10. The structure of claim 1 wherein the underlayer is selected from Ru and a Ru alloy, wherein the granular ferromagnetic material is a Co alloy and wherein the nonmagnetic segregants are selected from one or more oxides of one or more of Si, Ta, Ti Nb, B, C, and W.

11. The structure of claim 1 wherein the cores of the first and second nanoparticles are $Fe_3O_4$ cores and the polymer ligand attached to the first and second nanoparticles is polystyrene.

12. The structure of claim 1 further comprising at least one seed layer between the nanoparticle template layer and the underlayer.

13. A perpendicular magnetic recording disk comprising:
 a substrate;
 a template layer on the substrate, the template layer comprising substantially a monolayer of first nanoparticles having a nanoparticle diameter distribution less than 10% and second nanoparticles having a nanoparticle diameter distribution less than 10%, each nanoparticle comprising a core with attached polymer ligands having functional groups, wherein the first nanoparticles have substantially the same size and the second nanoparticles have substantially the same size different from the size of the first nanoparticles, the nanoparticle cores forming a nonplanar topology at the surface of the template layer;
 a seed layer on the template layer;
 an underlayer selected from Ru and a Ru alloy on the seed layer; and
 a perpendicular magnetic recording layer on the underlayer and comprising a layer of granular ferromagnetic Co alloy and one or more oxides of one or more of Si, Ta, Ti Nb, B, C, and W.

14. The disk of claim 13 wherein the first and second nanoparticle cores are selected from iron-oxide ($Fe_3O_4$), CdSe, CdTe, PbSe, FePt, Si, ZnO, Au, Ru, Cu, Ag, Co, Pt and vanadium oxide ($VO_x$); and wherein the polymer ligands are selected from polystyrene, polydimethylsiloxane, polysiloxane, polyisoprene, polybutadiene, polyisobutylene polypropylene glycol, and polyethylene glycol.

15. The disk of claim 13 wherein the seed layer is a first seed layer and further comprising a second seed layer on and in contact with the first seed layer, and wherein the underlayer is on and in contact with the second seed layer.

16. The disk of claim 13 wherein the second nanoparticles comprise greater than or equal to 5% and less than or equal to 35% of the total of first and second nanoparticles.

17. The disk of claim 13 wherein the second nanoparticles comprise greater than or equal to 55% and less than or equal to 90% of the total of first and second nanoparticles.

18. The disk of claim 13 wherein the second nanoparticles have a diameter that is greater than or equal to 105 percent of the diameter of the first nanoparticles.

19. The disk of claim 13 wherein the topology of the template layer comprises bumps of nanoparticle cores of between 35 to 75 percent of the diameter of the nanoparticle cores.

* * * * *